Oct. 7, 1958 — C. W. PRICE — 2,855,086
BALE LOADING MACHINE
Filed Jan. 6, 1956 — 2 Sheets-Sheet 2
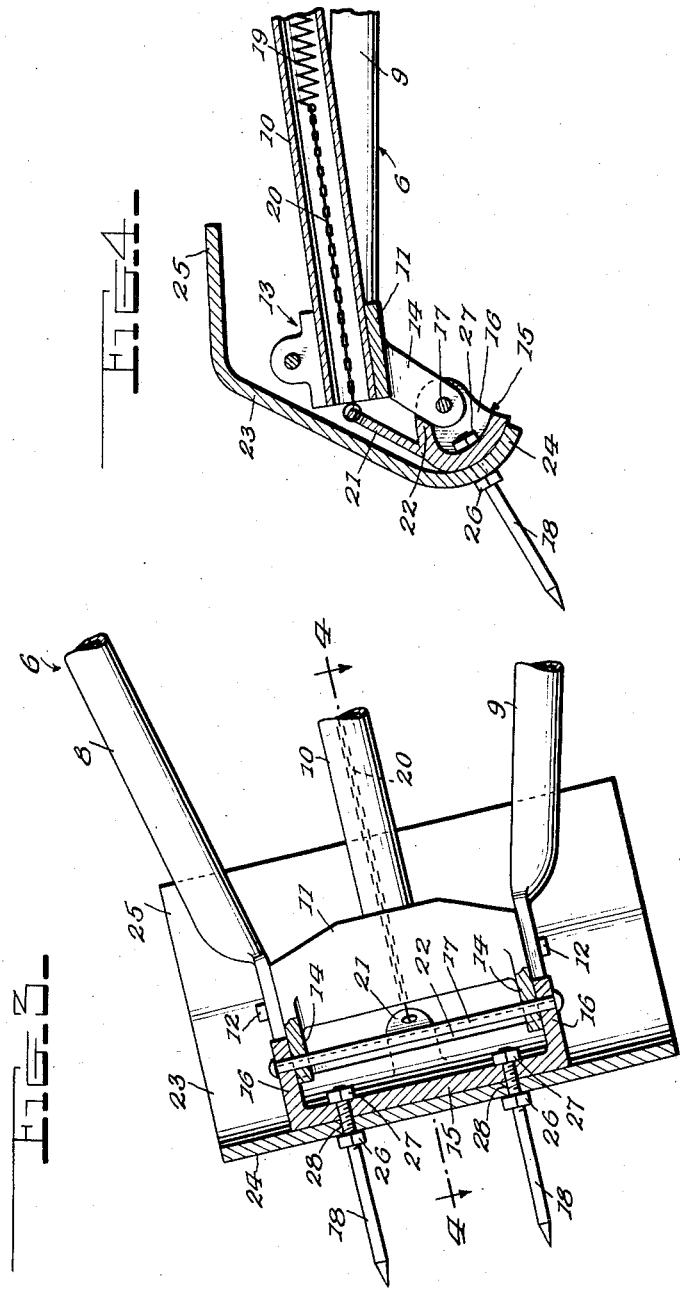
INVENTOR
Charles W. Price
BY Bryant & Lowry
ATTORNEYS

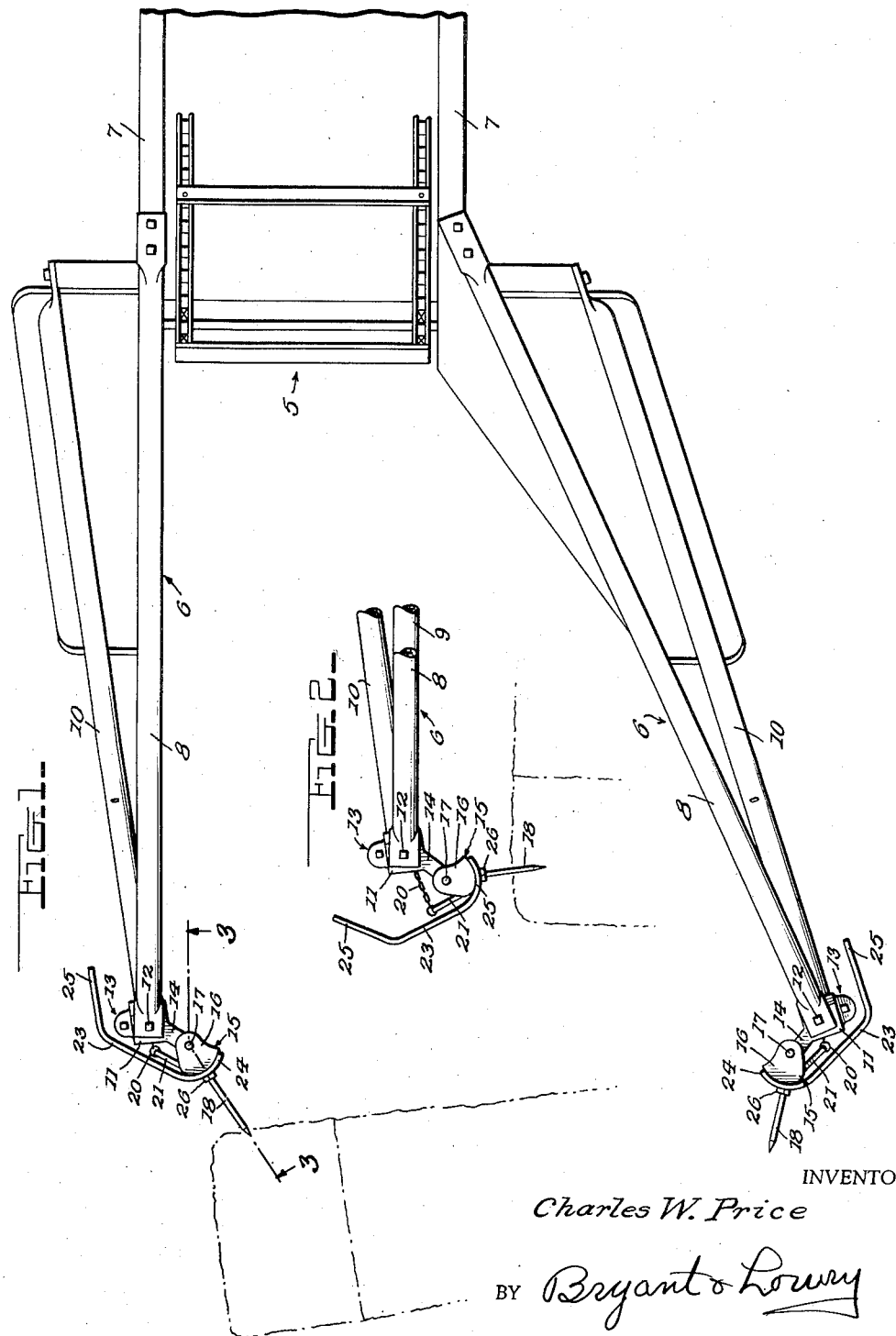

2,855,086

BALE LOADING MACHINE

Charles W. Price, Iowa Falls, Iowa

Application January 6, 1956, Serial No. 557,680

4 Claims. (Cl. 198—7)

This invention relates to an improvement in a known machine for elevating bales of hay or straw from a field and depositing them in a wagon, rack or the like for hauling from the field.

The known machine includes two bale-guiding side frames which diverge forwardly from the elevator, and the front ends of these side frames are provided with bale-turning assemblies for turning the bales substantially lengthwise of the machine for reception by the elevator. Each bale-turning assembly comprises bale-engaging prongs, a pivoted member carrying these prongs, and spring means biasing this pivoted member to a normal position in which said prongs project forwardly. By guiding the machine to cause the prongs to push against one end or the other of bales lying transversely of the path of the machine, the bales are turned to longitudinal positions for reception by the elevator. During the bale-turning operations, the prongs swing inwardly and rearwardly, become disengaged from the bales and are then restored to normal position in readiness for the next bale.

During the above described bale-turning operations, the front end of one or the other of the diverging side frames will frequently catch upon a bale, break the binding twine and so tear the hay or straw apart as to not only ruin the bale but necessitate stopping of the machine to clear the same. Moreover, one side frame or the other will often start to ride over a bale, necessitating that the machine be stopped, reversed and maneuvered to turn the bale to proper position. Such difficulties make the loading of bales from the field a time-consuming and arduous task in addition to ruining some of the bales.

The present invention is designed to so improve upon the machine as to avoid the occurrences above explained.

In carrying out the above end, another object is to provide novel guard plates secured to the prong-carrying members and extending in front of the diverging side frames to prevent contact of the front ends of the latter with the bales.

A further object is to provide a novel way of easily securing the guard plates to the prong-carrying members, the prongs and their usual securing nuts being utilized for this purpose.

With the above and other objects in view that will become apparent as the nature of the invention is better understood, the same consists in the novel form, combination and arrangement of parts hereinafter more fully described, as shown in the accompanying drawings, and claimed.

In the drawings:

Fig. 1 is a plan view of the front portion of a bale loading machine having the guard plates of the present invention;

Fig. 2 is a fragmentary plan view showing one set of the prongs and the associated guard plate turned to a different position;

Fig. 3 is an enlarged vertical sectional view on line 3—3 of Fig. 1; and

Fig. 4 is a substantially horizontal sectional view on line 4—4 of Fig. 3.

The front portion of a bale loading machine, improved in accordance with the present invention, is shown in the drawings. The conventional elevator 5 is provided, and two bale-guiding side frames 6 diverge forwardly from the elevator frame 7 as usual.

Each frame 6 comprises an upper bar 8, a lower bar 9, and an intermediate bar 10, all secured at their front ends to a head 11. The bars 8 and 9 are secured against the ends of the head 11 by means of cap screws 12, and the intermediate portion of this head is clamped at 13 to the bar 10. All of the bars 8, 9 and 10 are tubular.

Each head 11 is provided with arms 14 which project inwardly and somewhat forwardly therefrom. In front of these arms 14, there is a vertically elongated prong-carrying member 15 having ears 16 contacting with the arms 14, said ears and arms being pivotally connected by a rod 17 extending therethrough. The member 15 supports bale-engaging prongs 18 and is spring-biased to a position in which these prongs normally project forwardly and somewhat inwardly.

The biasing spring for each member 15 is housed in the tubular bar 10. A portion of one of the springs is shown at 19 in Fig. 4, said spring being connected by a chain 20 with a lateral lug 21 on said member 15, said lug being immediately in front of the bar 10. The movement of the member 15 under the influence of the spring 19, is limited by contact of the flange portion 22 of said member 15 against the arms 14 as seen in Fig. 4.

All of the elements 5 to 22, inclusive, are known and the prior machine embodying these elements has possessed the above mentioned drawbacks.

The present invention provides two substantially vertical guard plates 23 disposed in front of the two diverging side frames 6, respectively, and also in front of the lugs 21. These guard plates 23 have inner edge portions 24 secured against the front sides of the members 15, and outer edge portions 25 which extend rearwardly at the outer sides of the frames 6 and the clamping means 13. Thus, the guard plates 23 prohibit contact of the heads 11 and their clamping means 13, and the members 15 and their lugs 21, with said bales, and prior bale-snagging difficulties are therefore overcome. Moreover as the guard plates 23 extend down below the bars 9, almost to the ground, danger of the side frames riding up over bales, is greatly reduced.

It is customary to extend the rear ends of the prongs 18 through openings in the members 15 and to provide them with front and rear securing nuts 26 and 27, and it is preferred to utilize these elements 18, 26 and 27 in securing the guard plates 23 to the members 15. To accomplish this, openings 28 are formed in the guard plates 23 to receive the rear portions of the prongs 18, as seen in Fig. 3, the front nuts being disposed against the front sides of said plates 23 and the rear nuts 27 against the rear sides of the members 15.

From the foregoing, it will be seen that a distinct improvement has been provided, and while there is herein shown and described the preferred embodiment of the invention, it is nevertheless to be understood that minor changes may be made therein without departing from the spirit and scope of the invention as claimed.

I claim:

1. In a bale loading machine of the type having a bale elevator, two bale-guiding side frames diverging forwardly from said elevator, two prong-carrying members pivoted on substantially vertical axes to the front ends of said side frames respectively, bale-turning prongs on said prong-carrying members, and spring means normally biasing the latter to positions in which said prongs project forwardly; the improvement comprising two substantially vertical guard plates provided with unbroken surfaces and disposed in front of and in spaced relationship to the said side frames, said plates completely encompassing the front ends of said frames so as to shield and prevent the front ends of said side frames from contacting the bales, said guard plates being secured to said prong-carrying members respectively and being swingable bodily therewith with only the prongs projecting forwardly of the guard plates.

2. A structure as specified in claim 1; said prong-carrying members being offset inwardly from the front ends of said side frames, said guard plates extending outwardly and rearwardly from said prong-carrying members and terminating in free outer edge portions which extend rearwardly at the outer sides of said side frames.

3. In a bale loading machine of the type having a bale elevator, two bale-guiding side frames diverging forwardly from said elevator, two prong-carrying members pivoted on substantially vertical axes to the front ends of said side frames respectively, said prong-carrying members being offset inwardly from said side frames and having laterally projecting lugs in front of the latter, bale-turning prongs on said prong-carrying members, and spring means connected with said lugs respectively and normally biasing said prong-carrying members to positions in which said prongs project forwardly; two substantially vertical guard plates provided with unbroken surfaces disposed in spaced relationship to and in front of the said frames and lugs, said plates completely encompassing and shielding the front ends of said frames and lugs from contact with the bales, said guard plates having inner edge portions secured to said prong-carrying members respectively, said guard plates having free outer edge portions directed rearwardly at the outer sides of said side frames with only the prongs projecting forwardly of the guard plates.

4. A structure as specified in claim 3, in which said prongs extend through openings in said prong-carrying members and are provided with front and rear securing nuts in front of and behind said prong-carrying members respectively, said guard plates having openings through which said prongs extend and being clamped against said prong-carrying members by means of said front nuts.

References Cited in the file of this patent

UNITED STATES PATENTS

| | | |
|---|---|---|
| 2,409,143 | McElhinney et al. | Oct. 8, 1946 |
| 2,597,220 | Appel | May 20, 1952 |
| 2,615,586 | Miller et al. | Oct. 28, 1952 |
| 2,653,721 | Cantrell | Sept. 29, 1953 |